Oct. 6, 1953 W. V. SPURLIN 2,654,466
ELASTOMER SUPPORTED VIBRATORY FEEDER MOTOR
Filed Dec. 26, 1950 4 Sheets-Sheet 1

INVENTOR.
William V. Spurlin
BY
His Attorney.

Oct. 6, 1953 W. V. SPURLIN 2,654,466
ELASTOMER SUPPORTED VIBRATORY FEEDER MOTOR
Filed Dec. 26, 1950 4 Sheets-Sheet 2
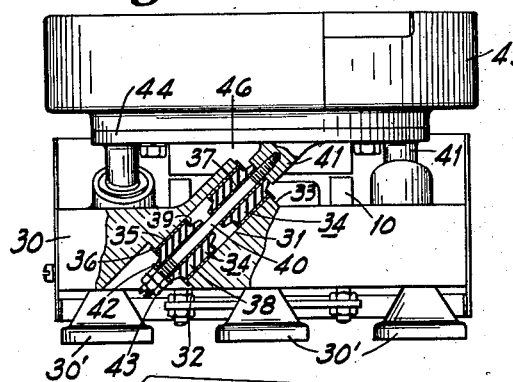
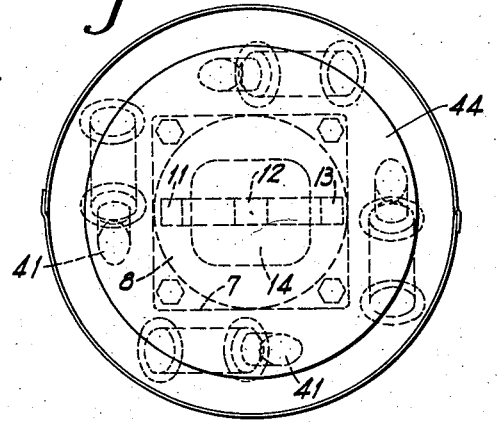
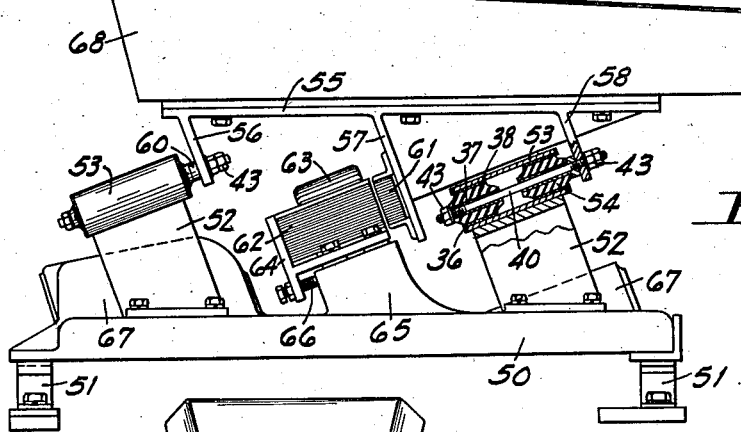
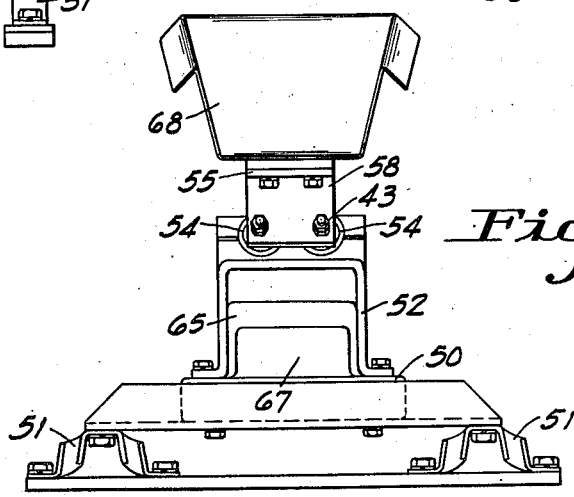
INVENTOR.
William V. Spurlin
BY
William D. Carothers
His Attorney.

Oct. 6, 1953 — W. V. SPURLIN — 2,654,466
ELASTOMER SUPPORTED VIBRATORY FEEDER MOTOR
Filed Dec. 26, 1950 — 4 Sheets-Sheet 3
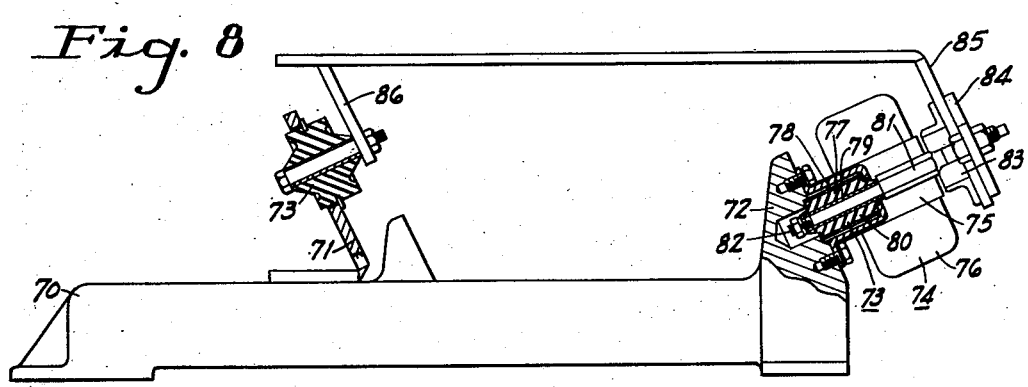
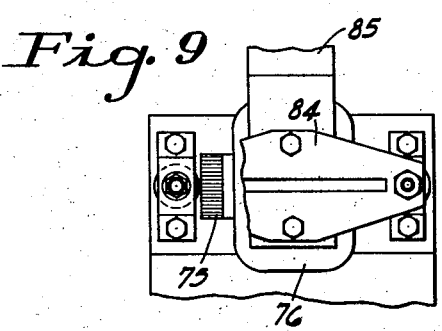
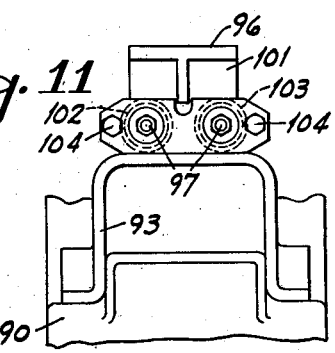
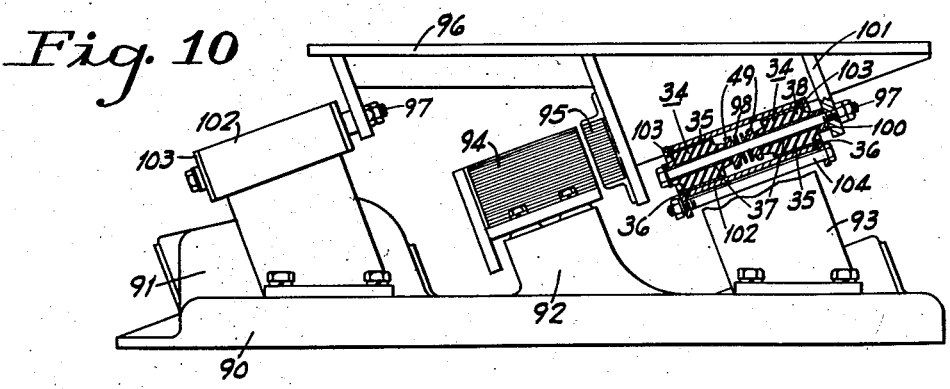
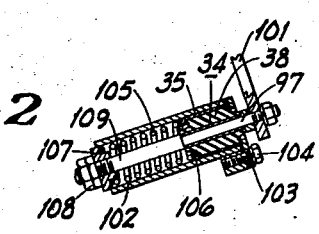
INVENTOR.
William V. Spurlin
BY
His Attorney.

Oct. 6, 1953 W. V. SPURLIN 2,654,466
ELASTOMER SUPPORTED VIBRATORY FEEDER MOTOR
Filed Dec. 26, 1950 4 Sheets-Sheet 4
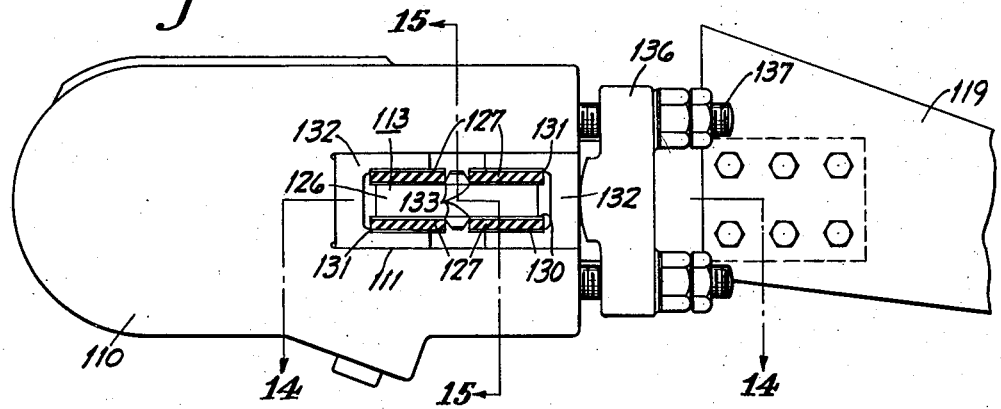
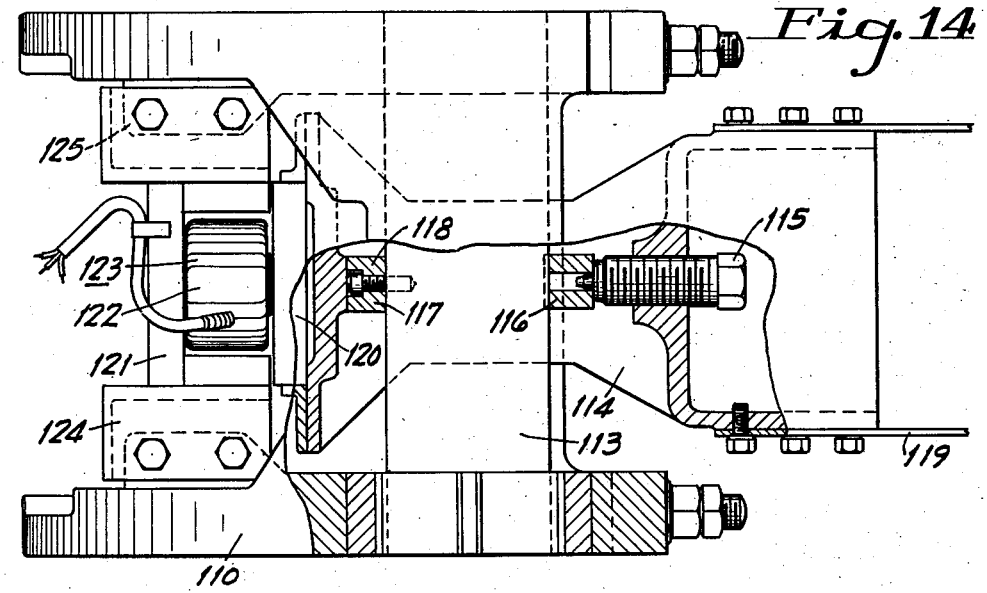
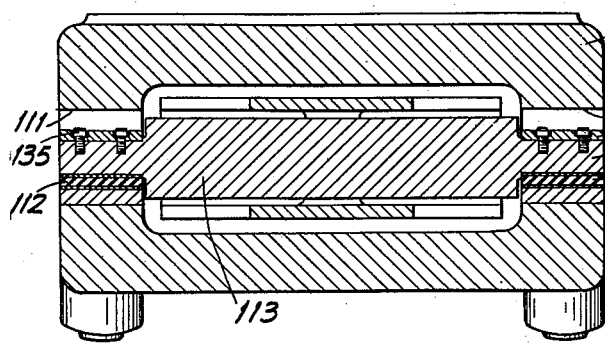
INVENTOR.
William V. Spurlin
BY *William D. Carothers*
His Attorney.

Patented Oct. 6, 1953

2,654,466

UNITED STATES PATENT OFFICE 2,654,466

ELASTOMER SUPPORTED VIBRATORY FEEDER MOTOR

William V. Spurlin, Indiana, Pa., assignor to Syntron Company, Homer City, Pa., a corporation of Delaware Application December 26, 1950, Serial No. 202,738

9 Claims. (Cl. 198—220)

This invention relates generally to feeder motors and more particularly to a vibratory feeder motor having an elastomer spring supported frame which carries the feeder or conveyor.

The principal object of this invention is the provision of an elastomer spring for supporting a frame on which the conveyor is mounted for vibration and wherein the vibration is in the path passing through the frame member at an angle to the horizontal to effect a conveying type of movement with vertical and horizontal components. The elastomer for use in this vibratory motor may be rubber or synthetic rubber or resinous material that is flexible and has similar properties. Such a structure has entirely different characteristics than that of steel springs which were formerly employed for vibratory conveyor motors of this character.

Another object of this invention is the provision of an elastomer spring means for supporting the vibratory structure of a conveyor which is designed to either convey the material in a circular path or in a straight path.

Another object of this invention is the provision of an elastomer supported vibratory motor that is readily tuned to within a few cycles of the frequency of the pulsating driving current so that the mechanical vibratory system will follow in step with the pulsating driving current.

Another object of this invention is the provision of an elastomer spring for supporting a vibratory system wherein the elastomer is under shear in supporting the member for vibration in a plane that is at an angle to the horizontal relative to the frame being vibrated.

Another object of this invention is the provision of specific structural features of an elastomer spring means for supporting the vibratory member of an electromechanical vibratory motor.

Other objects and advantages appear hereinafter in the following description and claims.

The accompanying drawings show for the purpose of exemplification without limiting the invention or claims thereto, certain practical embodiments of the invention wherein:

Fig. 4 is a side elevation of a circular conveyor with some parts broken away and other parts shown in section to illustrate a different character of elastomer supporting means.

Fig. 5 is a plan view of the structure shown in Fig. 4.

Fig. 6 is a side elevation with parts broken away and in section to illustrate a longitudinal conveyor supported by an elastomer spring.

Fig. 7 is an end elevation of the structure shown in Fig. 6.

Fig. 8 is a side elevation showing another form of a conveyor motor.

Fig. 9 is an end elevation of the structure shown in Fig. 8.

Fig. 10 is a side elevation partly in section illustrating a conveyor motor having a preloaded elastomer spring member.

Fig. 11 is an end view of the structure shown in Fig. 10.

Fig. 12 is a sectional view of a modified form of a spring loaded elastomer spring member.

Fig. 13 is a view in side elevation of a conveyor supported by flat elastomer spring means with the elastomer in shear.

Fig. 14 is a view in horizontal section taken on the line 14—14 of Fig. 13.

Fig. 15 is a view in vertical section taken along the line 15—15 of Fig. 13.

Figure 1:
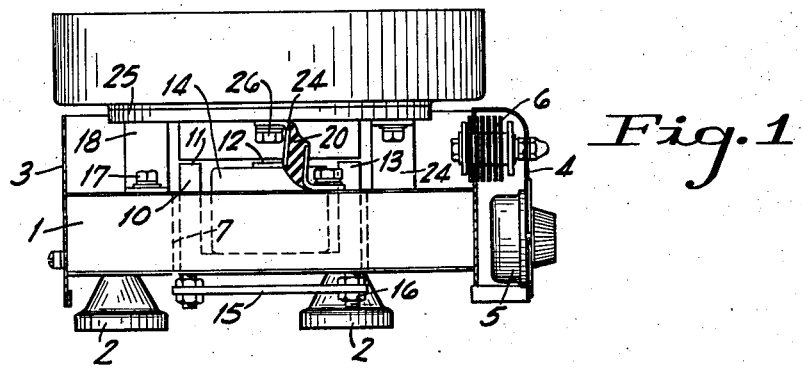
Fig. 1 is a view in side elevation of a circular conveyor with the casing broken away to show some parts in elevation.
Figure 2:
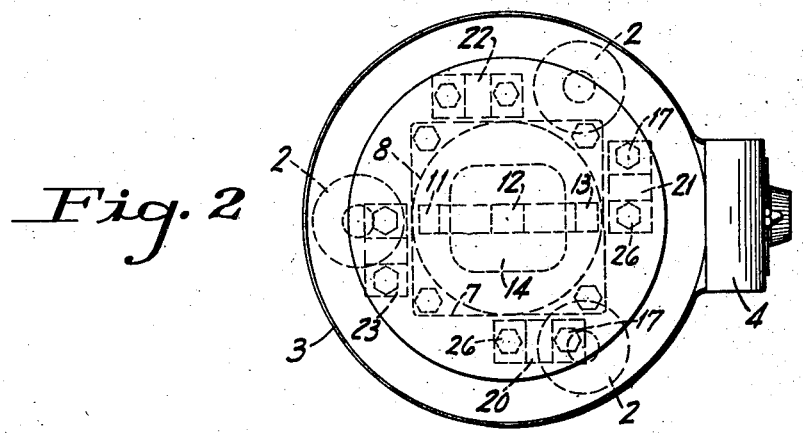
Fig. 2 is a plan view of the structure shown in Fig. 1.
Figure 3:
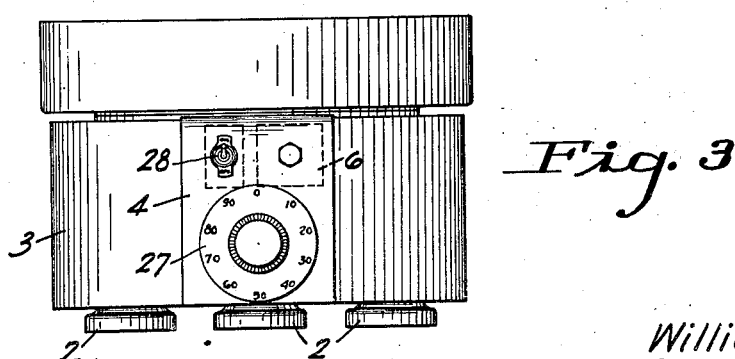
Fig. 3 is a side elevation of the structure shown in Fig. 1.

Referring to Figs. 1 to 3 of the drawings 1 represents a heavy massive base which is a heavy casting supported by the rubber feet 2 and having mounted thereon the annular casing 3 and the control housing 4 which contains the rheostat 5 and the rectifiers 6.

The casting 1 has a hollow circular center 7 as indicated in Fig. 2 for the purpose of receiving the electromagnetic field member 8 which is made up of the core 10 having the three pole faces 11, 12 and 13. Around the center pole 12 is mounted the coil member 14. The core member 10 is mounted on the square plate 15 which is secured by the studs 16 to the base as indicated in the drawings. The top of heavy base casting 1 is provided with threaded openings to receive the assembly bolts 17 for the elastomer spring attaching member or bracket means 18. There are four elastomer springs 20, 21, 22 and 23. The other bracket 24 of each of the spring members is secured to the underside of the frame member 25 by the bolts 26 as shown in Fig. 1. The frame member 25 in this instance is an annular deck which is constructed to support a bowl type feeder or an inclined feeder for conveying material from one elevation to another, the article conveyor track being in the form of a spiral or a helix.

As shown in Fig. 3 the rheostat 5 is provided with a dial 27. The switch 28 functions to energize the coil 14 through the rheostat and the half-wave rectifier in series with a suitable alternating current supply. The half-wave rectifier allows an impulse every cycle and the elastomer spring members 20 to 23, inclusive, are tuned so that the load which includes a filled conveyor bowl will vibrate in synchronism with the pulsating currents and the natural period of vibration should be a few cycles from the frequency of the pulsating current, but not in synchronism therewith.

The structure as shown in Figs. 4 and 5 is likewise a bowl feeder such as shown in Fig. 1. However the base casting 30 is supported by the rubber feet 30' and it is likewise provided with an annular opening 7 for receiving the core member 10 which carries the electromagnet coil 14 and is supported by the plate 15 on the underside thereof, which plate is bolted to the studs 16 in the same manner as that shown in Figs. 1 to 3.

The base casting 30 is provided with four sloping holes 31, each of which is placed at 90° from the other around the casting as shown. The slope of the holes 31 is substantially 35° from the horizontal.

The openings 31 are provided with an annular shoulder 32 at the lower end and a tube to provide an annular shoulder 33 at the upper end. Each of these shoulders is normal to the axis of the opening 31.

Each of the holes 31 is provided with a dual elastomer spring element 34 which comprises an outer cylindrical shell member 35, which has a flange 36 seated on the annular shoulders at the end of each opening, and an inner tube member 37 with the elastomer material 38 being vulcanized between the shell member 35 and the tube 37 and having its ends undulated as illustrated at 39.

The tubes 38 are constructed to receive the bolt 40 which is secured in the threaded opening in the lugs 41. The ends of the elastomer members 34 and their tubes 37 project beyond their cylinders 35 for engagement. The ends of the bolts 40 have washers 42 for engaging the protruding ends of the springs which are held in locked position by the nuts 43. By taking up the nuts 43 the tubes 37 may be drawn toward one another and thereby displace both of the elastomer members accordingly as flexure permits axial movement of the stud 40. Thus the elastomer material between the shells and the tubes is placed under shear. By tightening the bolts 40, a certain amount of shear is placed on each of the elastomer members to preload them to tune the same so that the frame 44, which is thus resiliently supported for vibration with its feeder bowl or other conveyor member 45, is designed to have a natural period of a few cycles from the driving frequency of the pulsating driving current.

It will be noted that the armature 46 is disposed directly above the core member 10 and is drawn downwardly by the same. However, the disposition of the elastomer members being at an angle relative to the magnetic force causes the frame member 44 to be vibrated at an angle relative to the horizontal and the elastomer members with their respective studs 40 guide the up and down movement of the frame member 44.

As shown in Fig. 5 there are four sets of elastomer elements disposed at quadrilateral positions about the base 30. This device may also be provided with a vibratory motor, rheostat, and rectifier similar to that shown in Fig. 1. However such a control is not shown in these views.

The structure shown in Figs. 6 and 7 comprises a heavy base casting 50 supported by the elastomer elements 51 and is provided with standards 52 which have cylindrical sockets 53 at the upper end thereof for receiving the elastomer supporting members 54, there being two in each of the four sockets 53. Elastomer members 54 are similar in construction to the elastomer members 34 in Figs. 4 and 5 and comprise the outer shells 35 with their outwardly projecting annular flange 36 and the central tube 37 with the elastomer material 38 vulcanized to the adjacent annular surfaces of the tube and the shell. The conveyor frame member 55 is provided with three depending flanges 56, 57 and 58 for the purpose of attaching and supporting the same by the spring members 54. Each of the flanges 56, 57 and 58 is rigid relative to the frame construction.

Each of the flanges is secured to the stud 40 by means of the nuts 43. A spacer 60 is inserted between the flanges and the elastomer members 54 to provide ample clearance for vibration of the frame 55. The spacers 60 engage the inner tube of the elastomer material. By tightening the nuts 43 at either end of the bolt 40 the elastomer members 54 are placed under compression, each being drawn toward one another and placing the elastomer material of each spring in shear. When the spacers 60 are properly selected to position the frame, the armature 61 is supported from the core member 62 to provide the proper operating air gap. The electromagnetic motor comprises the armature 61, the core member 62 and the coil member 63, the last two of which are mounted on the frame 64 that is adjustably secured on the lug 65 by means of the adjusting bolts 66. Additional weight 67 is provided on the base 50 to provide transmission of the maximum amount of vibratory movement to the frame 55. The frame 55 supports the longitudinal conveyor trough 68 and the motion of the magnetic lines of force is parallel to that of the flexure or movement of the elastomer members 54 which is angular relative to the surface of the trough.

The structure as shown in Figs. 8 and 9 has a similar vibratory feeder mechanism to that just described. The base 70 is provided with the upstanding brackets 71 and 72, the first of which supports the vibratory spring member indicated at 73. The motor 74 is constructed somewhat different than the electromagnetic motors as shown in the other views. The motor member 74 is made up of the core members 75 and 76 which are secured to the face of the bracket 72. On each side of the core is an elastomer spring member 77 which comprises the outer cylindrical case 78 and the inner coaxial tube member 79 between which the elastomer member 80 is vulcanized. The bolt 82 passes through the tube member for the purpose of holding the armature member 83 in spaced relation to the pole faces of the core member 75. The armature member 83 on the plate 84 is secured in place by means of the bolts on the outer end of the spacer member 81. The plate 84 extends across the electromagnetic motor and has the armature 83 bolted thereto. The bolts also secure rigid frame member 85 to the plate 84. The frame member 85 likewise extends to the rear and is provided with the depending arm 86 which is secured to the elastomer spring member 73 as shown and in a manner similar to that previously described. Thus the rigid frame member 85 is resiliently supported on the elastomer members for vibration. The vibration is delivered by the motor 74 along the axis of the bolts that pass through the inner tubular members of the elastomer spring means.

Referring now to Figs. 10, 11 and 12 the base 90 is provided with supporting members 91, 92 and 93, the first and the last support members 91 and 93 are constructed to carry the elastomer spring members, whereas the intermediate member 92 is constructed to carry the electromagnetic vibratory motor 94 which comprises a core member and an electromagnetic coil. The armature 95 is secured to the frame 96 which is rigid and the members to be vibrated are supported thereon.

The elastomer spring members as shown in this construction are the same as that shown at 34 in Fig. 4 and comprise the casing member 35 with the annular flange 36 and the central tubing 37 with the elastomer material 38 vulcanized therebetween. Each of the elastomer spring members 34 is mounted on a bolt 97 with helical spring 98 between the washers 99 for the purpose of allowing the elastomer springs 34 to work without or with preload. A spacer 100 is employed between the arm 101 of the frame 96, the bolt, and the uppermost elastomer member 34.

Two of the elastomer members are mounted in the tubing 102 which is bolted to the plates 103 by means of the bolts 104. The two elastomer members 34 in each pocket lie in tandem and two sets of the same are placed in multiple as shown in Fig. 11.

In the structure shown in Fig. 12 one elastomer member 34 is placed alone in the cylinder 102 and between the plates 103, but in place of having an additional elastomer member to preload each other the helical spring 105 is employed which is pressed against the washer 106 that engages the outer sleeve member 35 at one end and the washer 107, and the other end is pressed against the nuts 108 thereby placing a shearing load on the elastomer material 38. Thus a preload force can be placed on the vibratory elastomer members by means of a coil spring or by using one elastomer member against the other.

The structures shown in Figs. 13, 14 and 15 disclose a heavier motor for conveyors or screens wherein the motor frame 110 is a massive casting having spaced end slots 111 for receiving the elastomer spring members 112 for supporting the bar 113 that is secured to the armature frame 114 by means of the bolt 115 and ring 116 which clamps the bar against the seat 117 that is provided with a centering lock in the form of the screw 118.

The armature 120 is secured on one end of the frame 114 and is supported in operative spaced relation relative to the pole faces of the core 121 of the coil 122 of the vibratory motor 123. This motor is supported by the plates 124 bolted to the ribs 125.

The ends 126 of the bar 113 are reduced and extend into the slots 111. These reduced end portions 126 are supported between four elastomer spring means 127 constructed of rubber or some other elastomer 128 vulcanized to the outer and inner shear plates 130 both of which are as wide as the slot 111 but less than half as long.

The ends of each of the outer shear plates 130 are seated in the corners 131 of the C blocks 132 and the inner ends of each of the inner shear plates 130 are seated in the corners 133 formed by the blocks 134 bolted to the bar 113 by the bolts 135. The C blocks 132 are clamped in place by the clamping bridge members 136 and the bolts 137. Pressure applied on the clamping bridges 136 by the bolts 137 places a preshearing load on the four elastomer members 127 at each end of the bar 113 and supports the armature 120 and frame 114 for vibration. Ribs 119 may be secured to the frame 114 to rigidly brace or otherwise support a conveyor, screen or other structure the vibratory motor is to vibrate.

I claim:

1. An elastomer vibratory spring supporting means comprising an elastomer spring means having a natural frequency of vibration, members secured to opposite surfaces of the elastomer spring means, and means independent of the mass supported to apply a force on one of said members to deform and preload the elastomer spring means to vary the natural frequency of vibration of the same.

2. An elastomer vibratory spring supporting means comprising an elongated elastomer sleeve having a natural frequency of vibration, members secured to the inner and outer surfaces of the sleeve for mounting the elastomer spring means, and adjustable means to apply an axial force effective on the ends of the elastomer sleeve to preload and deform the elastomer sleeve independently of the mass supported to vary the natural frequency of vibration of the same.

3. An elastomer vibratory spring supporting means comprising a pair of elastomers having a natural frequency of vibration, a member secured to each of the opposite surfaces of each elastomer for mounting the same as a spring, means to mount one member of each elastomer fixed relative to each other with the elastomers in alignment, and adjustable means to exert pressure on the other of said members to preload and deform the elastomer spring means independently of the mass supported to vary the natural frequency of vibration of the same.

4. The structure of claim 3, characterized in that said pressure exerting means tends to move the other of said members together.

5. The structure of claim 3, characterized in that said pressure exerting means tends to move said other members apart.

6. The structure of claim 3 characterized in that said pressure exerting means includes a spring mounted between the aligned elastomers to exert a force thereon tending to flex them from each other, and a clamp means engaging the elastomers opposite to that of the spring to exert a force thereon opposing that of the spring.

7. A vibrating mechanism comprising a base, a mass carrying frame to be vibrated, elastomer springs providing the sole support of said frame on said base, means independent of the mass supported to deform the elastomer spring means to tune the same, each tuned elastomer spring having its opposite faces engaging the base and the frame to support the latter for vibratory movement by the flexure of the elastomer in a path at an acute angle to the horizontal to effect a conveying type of movement to the frame with vertical and horizontal components, and motor means to actuate said frame in its vibratory movement on said tuned spring means.

8. The structure of claim 7 characterized in that said tuned elastomer springs include attaching member on each of the opposite faces engaging the base and the frame, and fastening means to secure said members to the base and to the frame and permit the tuned elastomer springs to flex in a path at an acute angle to the horizontal.

9. The structure of claim 7 characterized in that said elastomer deflecting means also aids in securing the elastomer springs relative to said frame.

WILLIAM V. SPURLIN.

References Cited in the file of this patent

UNITED STATES PATENTS

| Number | Name | Date |
| --- | --- | --- |
| 1,945,015 | Wurzbach | Jan. 30, 1934 |
| 1,986,102 | Cole | Jan. 1, 1935 |
| 2,071,373 | Wurzbach | Feb. 23, 1937 |
| 2,444,134 | Hittson | June 29, 1948 |
| 2,472,637 | Weyandt | June 7, 1949 |